(12) United States Patent
Oshiba

(10) Patent No.: US 8,976,656 B2
(45) Date of Patent: Mar. 10, 2015

(54) AVAILABLE BANDWIDTH MEASUREMENT SYSTEM, TRANSMISSION DEVICE, AVAILABLE BANDWIDTH MEASUREMENT METHOD AND RECORDING MEDIUM

(75) Inventor: Takashi Oshiba, Tokyo (JP)

(73) Assignee: Nec Corporation, Tokyo (JP)

( * ) Notice: Subject to any disclaimer, the term of this patent is extended or adjusted under 35 U.S.C. 154(b) by 253 days.

(21) Appl. No.: 13/641,185

(22) PCT Filed: Apr. 22, 2011

(86) PCT No.: PCT/JP2011/059975
§ 371 (c)(1),
(2), (4) Date: Oct. 15, 2012

(87) PCT Pub. No.: WO2011/132783
PCT Pub. Date: Oct. 27, 2011

(65) Prior Publication Data
US 2013/0034012 A1    Feb. 7, 2013

(30) Foreign Application Priority Data
Apr. 23, 2010  (JP) .................................. 2010-099914

(51) Int. Cl.
  *H04J 1/16*      (2006.01)
  *G06F 11/00*     (2006.01)
  *H04L 12/26*     (2006.01)

(52) U.S. Cl.
  CPC ............ *H04L 43/0882* (2013.01); *H04L 43/10* (2013.01)
  USPC ............................ 370/232; 370/241; 370/252

(58) Field of Classification Search
  CPC ..... H04L 43/02; H04L 43/04; H04L 43/0805; H04L 43/0882; H04L 43/0888; H04L 43/10; H04L 41/0896; H04L 12/2602
  USPC .................. 370/232, 235, 236, 241, 248, 252
  See application file for complete search history.

(56) References Cited

U.S. PATENT DOCUMENTS 6,614,763 B1 *  9/2003  Kikuchi et al. ............... 370/252
6,813,244 B1    11/2004 He et al.
(Continued)

FOREIGN PATENT DOCUMENTS

JP  2002-199009 A  7/2002
JP  2006-074773 A  3/2006
(Continued)

OTHER PUBLICATIONS

Ribeiro,Vinay, J., et al., "pathChirp: Efficient Available Bandwith Estimation for Network Paths", in Proc. of Passive and Active Measurement Workshop 2003.

*Primary Examiner* — Xavier Szewai Wong
(74) *Attorney, Agent, or Firm* — Sughrue Mion, PLLC

(57) ABSTRACT

A packet generation unit (10) generates a predetermined number of measurement packets at predetermined transmission intervals that increase in equal increments, and a transmission/reception unit (13) transmits the measurement packets to a reception device (2) in accordance with control performed by a transmission control unit (12). A calculation unit (21) calculates an available bandwidth in accordance with the reception intervals of the measurement packets received by a transmission/reception unit (20), and the transmission/reception unit (20) transmits the available bandwidth to a transmission device (1). A resolution alteration unit (14) determines, in accordance with the available bandwidth received by the transmission/reception unit (13), whether or not to change the measurement resolution. A size alteration unit (15) changes the minimum packet size, maximum packet size and packet size incremental increase amount when the resolution alteration unit (14) determines that the measurement resolution is to be changed. The packet generation unit (10) newly generates measurement packets in accordance with the changed values.

7 Claims, 8 Drawing Sheets

(56) References Cited

U.S. PATENT DOCUMENTS

| | | | |
|---|---|---|---|
| 8,014,381 B2 * | 9/2011 | Kumai et al. | 370/351 |
| 2007/0217448 A1 * | 9/2007 | Luo et al. | 370/468 |
| 2009/0201809 A1 * | 8/2009 | Sommerville et al. | 370/232 |
| 2009/0262657 A1 * | 10/2009 | Ekelin et al. | 370/252 |
| 2010/0110892 A1 * | 5/2010 | Lai et al. | 370/235 |
| 2012/0307661 A1 * | 12/2012 | Oshiba | 370/252 |

FOREIGN PATENT DOCUMENTS

| | | |
|---|---|---|
| JP | 2007-281801 A | 10/2007 |
| JP | 2008-258877 A | 10/2008 |

* cited by examiner

AVAILABLE BANDWIDTH MEASUREMENT SYSTEM, TRANSMISSION DEVICE, AVAILABLE BANDWIDTH MEASUREMENT METHOD AND RECORDING MEDIUM

CROSS REFERENCE TO RELATED APPLICATIONS

This application is a National Stage of International Application No. PCT/JP2011/059975, filed on Apr. 22, 2011, which claims priority based on Japanese Patent Application No. 2010-099914, filed Apr. 23, 2010, the contents of all of which are incorporated herein by reference in their entirety.

TECHNICAL FIELD

The present invention relates to an available bandwidth measurement system, a transmission device, an available bandwidth measurement method and a recording medium. More particularly, the present invention relates to technology for measuring available bandwidth in best effort type or variable bandwidth type communication.

BACKGROUND ART

In a network that shares bandwidth, bandwidth that can be used (hereafter, referred to as available bandwidth) is vacant bandwidth that is the result of subtracting other traffic that is flowing over a network (hereafter, referred to as cross traffic) from the physical bandwidth of the network. For example, in a case where the physical bandwidth is 100 Mbps and the cross traffic is 30 Mbps, the available bandwidth is 100-30=70 Mbps.

Knowing the available bandwidth is important when sharing data among terminals in real-time, or when performing voice communication among terminals.

Non-patent literature 1 discloses a method of measuring available bandwidth by a transmitting terminal transmitting a sequence of a plurality of measurement packets having a fixed size (hereafter, referred to as a packet train) to a receiving terminal, and the receiving terminal detecting changes in the reception interval between received measurement packets. When transmitting a packet train, the transmitting terminal exponentially decreases the transmission interval between the measurement packets.

With this measurement method, when the transmission rate of the measurement packets exceeds the available bandwidth of the network, the reception interval between measurement packets received by the receiving terminal becomes greater than the transmitting interval at the transmitting terminal. This measurement method uses this characteristic to detect the location where the reception interval between measurement packets received by the receiving terminal begins to become larger than the transmission interval of the measurement packets at the transmitting terminal, and divides the size of the measurement packets by the transmission interval at that location to measure the available bandwidth.

Moreover, patent literature 1 discloses a method for searching for the available bandwidth by the transmitting terminal repeatedly performing the operation of transmitting a packet train that is composed of a sequence of measurement packets having a fixed size and a uniform transmission interval. In this measurement method, when there is a tendency for the reception interval between packets received by the receiving terminal to be increasing, the transmitting terminal exponentially decreases the transmission interval and transmits a packet train to the receiving terminal, and when there is a tendency for the receiving terminal to be decreasing, the transmitting terminal exponentially increases the transmission terminal and transmits a packet train to the receiving terminal. In this method, this operation is performed repeatedly until the amount of change in the reception interval between received packets is within a predetermined range (stable range).

Patent literature 2 discloses a bandwidth measurement system that is capable of estimating an available bandwidth having high followability for following the change in traffic. This bandwidth measurement system transmits multiple pairs of test packets, and by fitting the distribution of reception intervals and transmission intervals of the test packets to a specified model, estimates the available bandwidth, and finds the error between the reception interval of the test packets and the model. Moreover, when the error in the packet transmission interval and the packet reception interval of the model becomes large, this bandwidth measurement system shortens the measurement interval.

Patent literature 3 discloses an information processing device that is capable of determining the optimum size of packets to be transmitted to an arbitrary network address. This information processing device transmits test data to at least one address, and determines according to the response to that test data whether or not the test data was able to arrive at that address. This information processing device changes the size of the packets to be transmitted, and determines the maximum size of packets that can arrive at the address as the optimum value. Alternatively, the information processing device transmits packets one at a time whose size has been gradually reduced, and finds the communication speed according to the time required for a response to be received, then determines the size of the packet having the fastest communication speed to be the optimum size.

PRIOR ART LITERATURE

Patent Literature

Patent literature 1: Unexamined Japanese Patent Application Kokai Publication No. 2006-74773
Patent literature 2: Unexamined Japanese Patent Application Kokai Publication No. 2008-258877
Patent literature 3: Unexamined Japanese Patent Application Kokai Publication No. 2007-281801

Non-Patent Literature

Non-patent literature 1: Vinay J. Ribeiro, Rudolf H. Riedi, Richard G. Baraniuk, Jiri Navratil and Les Cottrell, "pathChirp: Efficient Available Bandwidth Estimation for Network Paths", in Proc of Passive and Active Measurement Workshop 2003

DISCLOSURE OF THE INVENTION

Problems to be Solved by the Invention

In the available bandwidth measurement method that is disclosed in non-patent literature 1, the measurement resolution is a value that is a result of subtracting a value, which is obtained by dividing the packet size of the previous measurement packet by the transmission interval for each measurement packet, from a value, which is obtained by dividing the packet size of each measurement packet by the transmission interval. The transmission interval for each measurement packet is exponentially decreased, so that in one packet train, the measurement resolution each time the order of packets advances becomes exponentially rougher. Moreover, in this method, when the location where the reception interval between packets begins to increase can be detected, the same transmission interval for each measurement packet is used when transmitting the next packet train even though the measurement resolution at that location may be rough. Therefore, after the available bandwidth has once been calculated and the measurement resolution is bad, the resolution in the next measurement will also be bad, and it is not possible to improve the measurement resolution.

In the method disclosed in patent literature 1, the available bandwidth cannot be calculated by transmitting a single packet train, and in order to perform a binary search, it is necessary to repeatedly transmit a packet train many times. Therefore, when the "stable range" is narrowed in order to improve the measurement resolution, it is necessary to increase the number of times that a packet train is transmitted, and the transmission load becomes large. Consequently, it is not possible to improve the measurement resolution with a small transmission load.

Even in the case of the technology of patent literature 2 and patent literature 3, it is not possible to improve the measurement resolution with a small transmission load.

Taking the situation above into consideration, it is the objective of the present invention to provide an available bandwidth measurement system, a transmission device, an available bandwidth measurement method and a recording medium that are capable of measuring the available bandwidth with high resolution and small transmission load.

Means for Solving the Problems

The available bandwidth measurement system according to a first aspect of the present invention is a system that is provided with a transmission device and a reception device that are connected to a network; wherein the transmission device is provided with:

a generation unit that generates a specified number of measurement packets whose packet sizes increase in order by an equal difference;

a first transmission unit that transmits the measurement packets to the reception device; and a control unit that controls the first transmission unit so that the measurement packets are uniformly transmitted at a specified transmission interval; and the reception device is provided with:

a second reception unit that receives the measurement packets from the transmission device;

a calculation unit that, based on the time that the measurement packets are received, calculates an available bandwidth that indicates a bandwidth that can be used by the network; and a second transmission unit that transmits the available bandwidth to the transmission device;

the transmission device is further provided with:

a first reception unit that receives the available bandwidth from the reception device;

a judgment unit that, based on the available bandwidth, determines whether or not to change the measurement resolution; and an alteration unit that, based on the available bandwidth when the judgment unit determines to change the measurement resolution, changes a minimum packet size that indicates the smallest size of the measurement packets, a maximum packet size that indicates the largest size of the measurement packets, and a packet size incremental increase amount that indicates the equal difference; and wherein the generation unit generates new measurement packets based on the minimum packet size, maximum packet size and the packet size incremental increase amount that were changed by the alteration unit.

The transmission device according to a second aspect of the present invention is provided with a generation unit that generates measurement packets whose packet sizes increase in order;

a transmission unit that transmits the measurement packets at a specified transmission interval;

a reception unit that receives a measurement value for an available bandwidth that indicates the available bandwidth that was found based on the transmitted measurement packets;

a judgment unit that, based on the received measurement value for the available bandwidth, determines whether or not to change the measurement resolution; and an alteration unit that, when the judgment unit determined to change the measurement resolution, changes the size of the measurement packets based on the available bandwidth so that the measurement resolution increases; wherein the generation unit generates new measurement packets having the size changed by the alteration unit.

The available bandwidth measurement method according to a third aspect of the present invention is an available bandwidth measurement method that executes a system that is provided with a transmission device and a reception device that are connected to a network; wherein the transmission device executes:

a generation step that generates a specified number of measurement packets whose packet sizes increase in order;

a first transmission step that transmits the measurement packets to the reception device; and a control step that controls the first transmission unit so that the measurement packets are uniformly transmitted at a specified transmission interval; and the reception device executes:

a second reception step that receives the measurement packets from the transmission device;

a calculation step that, based on the time that the measurement packets are received, calculates an available bandwidth that indicates a bandwidth that can be used by the network; and a second transmission step that transmits the available bandwidth to the transmission device;

the transmission device further executes:

a first reception step that receives the available bandwidth from the reception device;

a judgment step that, based on the available bandwidth, determines whether or not to change the measurement resolution; and a generation step that, when the judgment step determined to change the measurement resolution, generates, based on the available bandwidth, new measurement packets having the changed size so that the resolution is improved.

The computer-readable recording medium according to a fourth aspect of the present invention stores a computer program that causes a computer to achieve:

a generation function that generates measurement packets whose packet sizes increase in order;

a transmission function that uniformly transmits the measurement packets in a specified order at a specified transmission interval;

a reception function that receives the measurement value for the available bandwidth that indicates the available bandwidth that was found based on the transmitted measurement packets;

a judgment function that, based on the available bandwidth, determines whether or not to change the measurement resolution; and a generation function that, when the judgment function determined to change the measurement resolution, generates, based on the available bandwidth, new measurement packets having the changed size so that the measurement resolution improves.

Effects of the Invention

With the available bandwidth measurement system, transmission device, available bandwidth measurement method and recording medium of the present invention, it is possible to improve the measurement resolution of the available bandwidth with a small communication load.

MODE FOR CARRYING OUT THE INVENTION

In the following, an available bandwidth measurement system 100 of an embodiment of the present invention will be explained.

Figure 1:
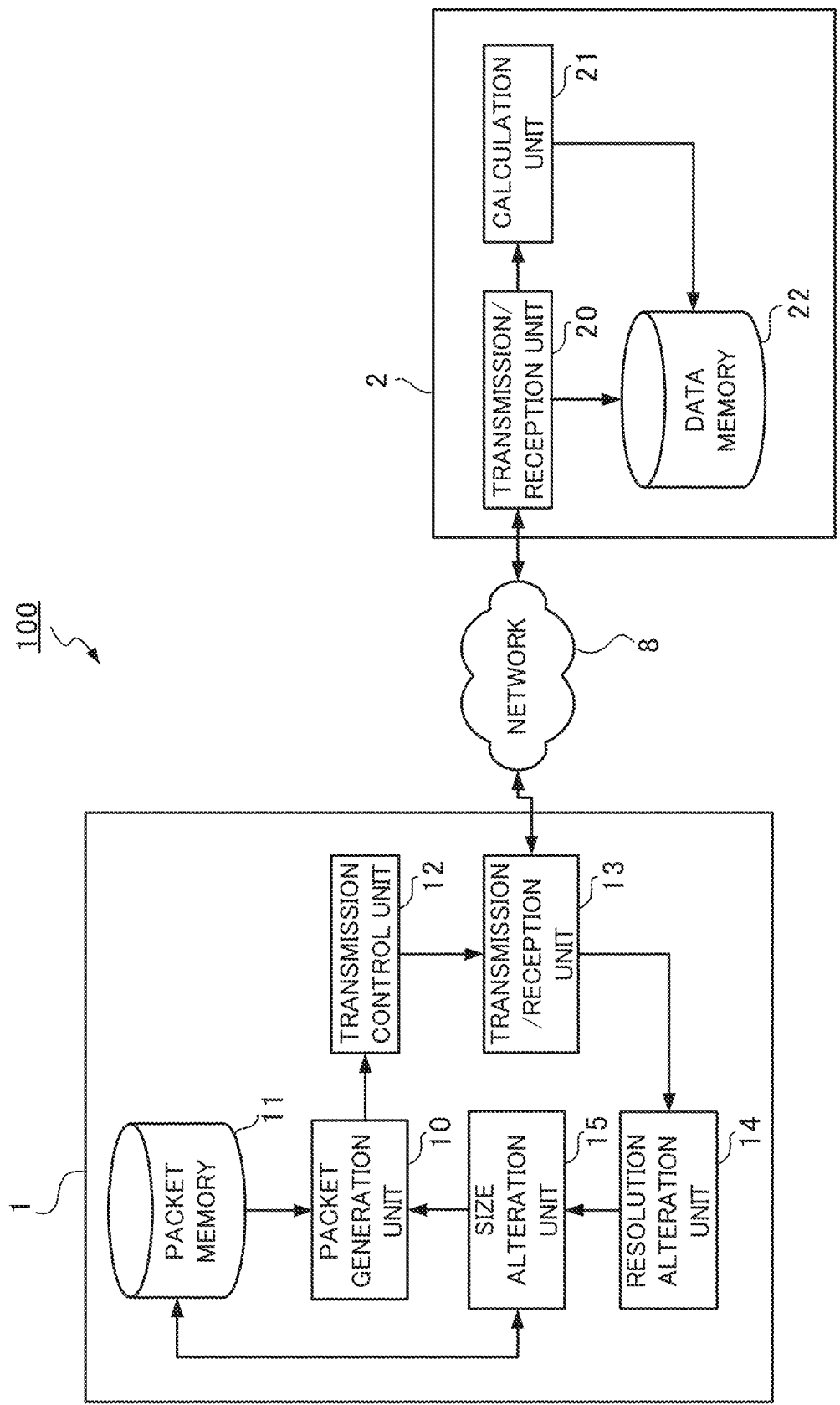
FIG. 1 is a block diagram illustrating an example of an available bandwidth measurement system of an embodiment of the present invention.

As illustrated in FIG. 1, the available bandwidth measurement system 100 is composed of a transmission device 1 and a reception device 2 that are capable of communication via a network 8. Here, the available bandwidth measurement system 100 is one function of a communication system that is made up of a plurality of communication devices that are mutually connected together by way of a network 8. One communication device of two arbitrary communication devices of a communication system functions as the transmission device 1, and the other communication device functions as the reception device 2. Each communication device has any one of the function of a transmission device 1, the function of a reception device or the function of a transmission device 1 and reception device 2. There is also no problem in the case wherein a communication device having none of these functions is included.

In FIG. 1, a transmission device 1 and reception device 2 are illustrated as representative devices, and information that is exchanged between transmission devices and reception devices other than the transmission device 1 and reception device 2 that are being focused on as communication devices of the communication system above is cross traffic.

By transmitting a packet train for measurement to the reception device 2, the transmission device 1 measures the available bandwidth of the network. A communication device that functions as a transmission device 1 and reception device 2 can also be a device that is provided with functions for exchanging information with the outside such as personal computer (PC), a personal digital assistance (PDA) such as mobile computer, a mobile telephone, a smartphone, a fixed landline telephone, a street multimedia terminal, an in-vehicle terminal, a television with a function for connecting to a network, a set-top box with a function for connecting to a network, and game device, a printer with a function for connecting to a network, a scanner with a function for connecting to a network, and the like.

The transmission device 1, functionally, is provided with a packet generation unit 10, a packet storage unit 11, a transmission control unit 12, a transmission/reception unit 13, a resolution alteration unit 14, and size alteration unit 15.

The packet generation unit 10 generates a packet train that is composed of N number of measurement packets whose sizes increase in order by an equal difference. Each measurement packet can be an IP (Internet Protocol) packet, a UDP (User Datagram Protocol) packet or RTP (Real-time Transport Protocol) Packet. The packets of the packet train are evenly spaced by a predetermined transmission interval. The transmission interval is the time from when the last bit of one measurement packet is transmitted until the last bit of the next measurement packet is transmitted. Alternatively, the transmission interval can be the time from when the first bit of one measurement packet is transmitted until the time when the first bit of the next measurement packet is transmitted. Moreover, the packet generation unit 10 generates a new packet train based on the minimum packet size, maximum packet size and packet size incremental increase amount changed by the size alteration unit 15. A measurement packet stores information that indicates the packet number that identifies that measurement packet, and the packet size and transmission interval of that measurement packet.

Figure 2:
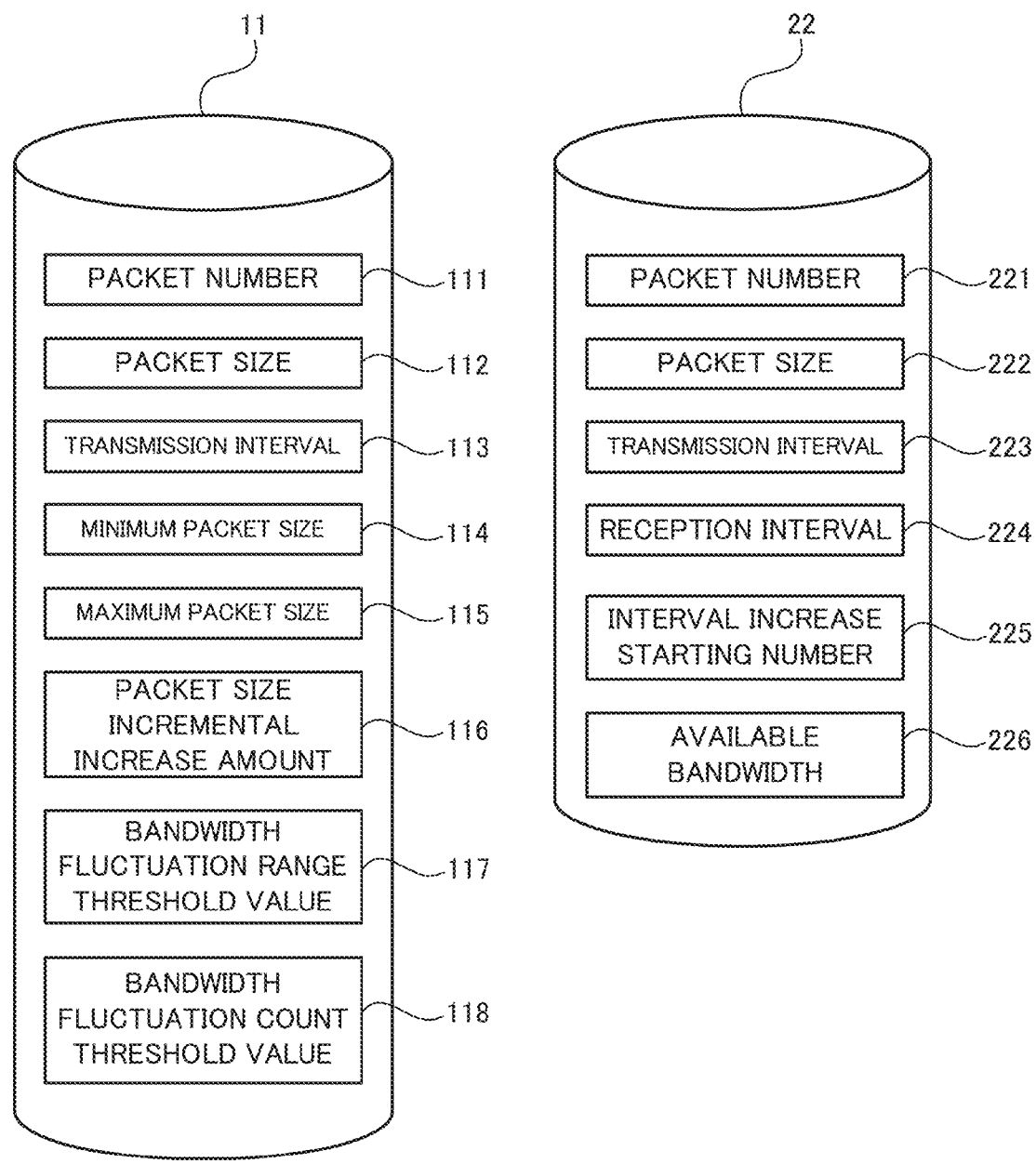
FIG. 2 is a drawing illustrating a packet storage unit and data storage unit of an embodiment of the invention.

The packet storage unit 11 stores the packet number, packet size, transmission interval, minimum packet size, maximum packet size, packet size incremental increase amount of the measurement packets that were generated by the packet generation unit 10, and a bandwidth fluctuation range threshold value and bandwidth fluctuation count threshold value for when the resolution alteration unit 14 determines whether or not to change the measurement resolution. The packet number, packet size, transmission interval, minimum packet size, maximum packet size, packet size incremental increase amount, bandwidth fluctuation range threshold value and bandwidth fluctuation count threshold value will be described in detail later with reference to FIG. 2.

The transmission control unit 12 controls the transmission/reception unit 13 so that measurement packets are transmitted at even intervals at the transmission interval stored in the packet storage unit 11.

The transmission/reception unit 13 transmits measurement packets that were generated by the packet generation unit 10, and receives information that indicates the available bandwidth.

The resolution alteration unit 14, based on the available bandwidth that is indicated by the available bandwidth information received by the transmission/reception unit 13, uses the bandwidth fluctuation range threshold value and bandwidth fluctuation count threshold value stored by the packet storage unit 11 to determine whether or not to change the measurement resolution.

When the resolution alteration unit 14 determines to change the measurement resolution, the size alteration unit 15, based on the available bandwidth received by the transmission/reception unit 13, changes the minimum packet size, the maximum packet size and the packet size incremental increase amount. Moreover, the size alteration unit 15 changes the bandwidth fluctuation range threshold value to correspond to the changed contents.

The reception unit 2 is provided with a transmission/reception unit 20, a calculation unit 21 and a data storage unit 22.

The transmission/reception unit 20 receives transmitted measurement packets, and transmits available bandwidth information that indicates the available bandwidth that was calculated by the calculation unit 21.

The calculation unit 21 compares the reception interval of the measurement packets that were actually received by the transmission/reception unit 20 with the transmission interface that was included in the measurement packets, and detects the measurement packet at the location (timing) when the reception interval first becomes larger than the transmission interval (hereafter, referred to as a boundary measurement packet), and based on the size of this boundary measurement packet, calculates a measurement value (estimated value) for the available bandwidth. The reception interval is the time from when one packet is completely received to when the next packet is completely received. Alternatively, the time from when reception of one measurement packet begins to when reception of the next measurement packet begins can be taken to be the transmission interval or reception interval. In the latter case, the reception interval is calculated backward from after one measurement packet is completely received to when reception started.

The data storage unit 22 stores the packet number, the packet size and the transmission interval that are included in the measurement packets received by the transmission/reception unit 20, the actual reception interval of the measurement packets received by the transmission/reception unit 20, interval increase starting number, and the available bandwidth. The packet number, the packet size, the transmission interval, the reception interval, the interval increase starting number, and the available bandwidth will be explained in detail below with reference to FIG. 2.

Next, the data stored by the packet storage unit 11 and the data storage unit 22 described above will be explained with reference to FIG. 2.

The packet storage unit 11 stores the packet number 111, packet size 112, transmission interval 113, minimum packet size 114, maximum packet size 115, packet size incremental increase amount 116, bandwidth fluctuation range threshold value 117, and bandwidth fluctuation count threshold value 118.

The packet number 111 is a number (identification information) for identifying each measurement packet of a packet train, and indicates the order that the packet was transmitted. The packet size 112 is the size of each measurement packet of a packet train. The transmission interval 113 is a preset value and is the time interval for transmitting each measurement packet of a packet train. The transmission interval of all of the measurement packets is the same value, and the packets are transmitted at uniform intervals.

The minimum packet size 114 is the size of the smallest measurement packet from among the measurement packets of a packet train, and is the size of the first measurement packet (packet number 111 "1"). The maximum packet size 115 is the packet size of the largest measurement packet from among the measurement packets of a packet train, and is the size of the Nth measurement packet (packet number 111 "N").

The packet size incremental increase amount 116 is the difference in size of adjacent measurement packets, and is the incremental increase amount of packet size in a packet train. Measurement packets are such that as the packet number 111 increases, the packet size increases in order by an equal difference, and the packet sizes of the measurement packets from the second measurement packet on are determined according to the packet size incremental increase amount 116. The bandwidth fluctuation range threshold value 117 is a threshold value for the range of values of the available bandwidth, and is used when determining whether or not to change the measurement resolution. The bandwidth fluctuation count threshold value 118 is a threshold value for the number of times that the values of the available bandwidth are within the range of the bandwidth fluctuation range threshold value 117, and is used when determining whether or not to change the measurement resolution.

The data storage unit 22 stores the packet number 221, the packet size 222, the transmission interval 223, the reception interval 224, the interval increase starting number 225 and the available bandwidth 226.

The packet number 221, the packet size 222 and the transmission interval 223 are the same as the packet number 111, the packet size 112 and the transmission interval 113. The reception interval 224 is the actual interval (time interval) at which each measurement packet of the packet train is received. The interval increase starting number 225 is the packet number 221 of the boundary measurement packet at the location where, when the reception interval 224 is compared with the transmission interval 223, the reception interval 224 first becomes greater than the transmission interval 223. For measurement packets having a packet number 221 that is fewer than the interval increase starting number "the reception interval 224 value=the transmission interval 223 value"; however, for measurement packets having a packet number 221 that is equal to or greater than the interval increase starting number 225, "the reception interval 224 value>the transmission interval 223 value". The available bandwidth 226 is the value of the available bandwidth that is calculated by the calculation unit 21 using a specified equation.

Figure 3:
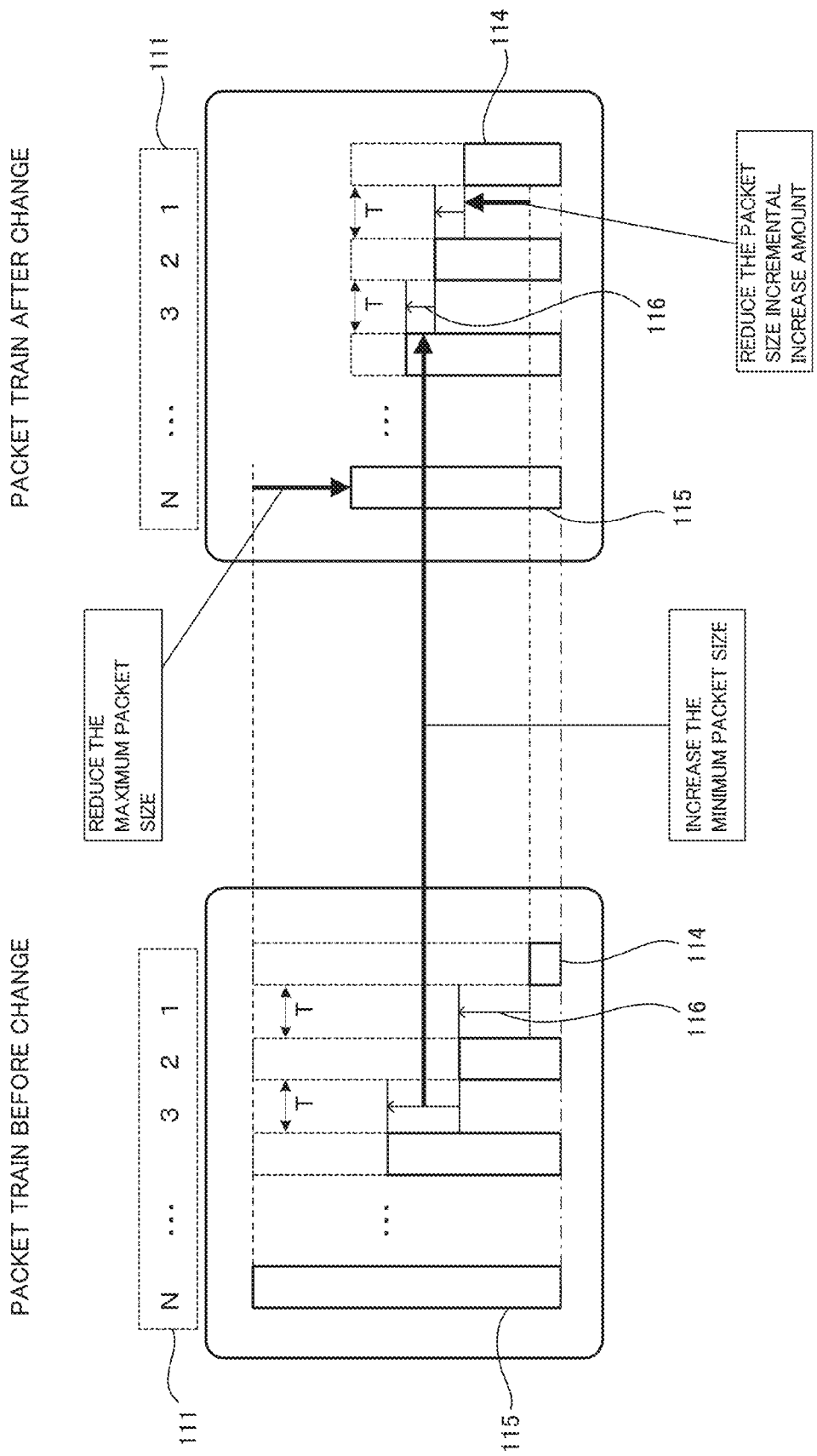
FIG. 3 is a drawing illustrating an example of change in the packet train of an embodiment of the invention.

Next, the method for changing a packet train will be explained with reference to FIG. 3. FIG. 3 illustrates before and after changing the measurement resolution, and illustrates how the packet size of each measurement packet will change.

It is presumed that N number of measurement packets make up one packet train.

The size before change of the first measurement packet of a packet train that was generated by the packet generation unit 10 of the transmission unit 1 is the minimum packet size 114. The packet size of the Nth measurement packet is the maximum packet size 115. The packet size of the ith (i=1, 2, 3, . . . , N) measurement packet is "minimum packet size 114+(i−1)×packet size incremental increase amount". The packet generation unit 10 generates N number of measurement packets. The ith measurement packet has a size indicated by the equation above. Moreover, the packet generation unit 10 stores the packet number 111, the packet size 112, and the transmission interval 113 for each measurement packet. The transmission control unit 12 controls the transmission/reception unit 13 so that the N number of measurement packets that were generated by the packet generation unit 10 are transmitted at a uniform transmission interval that was specified by the transmission interval 113. As a result, the packet train is transmitted to the reception device 2.

Each time the transmission/reception unit 20 of the reception device 2 receives a measurement packet of the packet train received from the transmission device 1, the transmission/reception unit 20 stores the packet number 111, the packet size 112 and the transmission interval 113 that are stored in each measurement packet in the data storage unit 22 as the packet number 221, the packet size 222 and the transmission interval 223. Moreover, for the second measurement packet on, the transmission/reception unit 20 stores the difference between the reception time of the measurement packet and the reception time of the one previous measurement packet in the data storage unit 22 as the reception interval 224.

Each time the transmission/reception unit 20 receives a measurement packet, the calculation unit 21 compares the size relationship of the reception interval 224 and the transmission interval 223, and detects the location where the value of reception interval 224 first becomes greater than the value of the transmission interval 223. Taking the value of the packet number 221 of the detected boundary measurement packet to be k, the calculation unit 21 stores the value of k in the data storage unit 22 as the interval increase starting number 225, and then using the equation "available bandwidth 226=(packet size 222 of the kth measurement packet) (transmission interval 223)", calculates the available bandwidth 226. The transmission/reception unit 20 transmits the available bandwidth 226 that was calculated by the calculation unit 21 back to the transmission device 1.

The resolution alteration unit 14 of the transmission device 1 determines whether or not to change the measurement resolution based on the available bandwidth 226 that was received by the transmission/reception unit 13, and the bandwidth fluctuation range threshold value 117 and the bandwidth fluctuation count threshold value 118 that are stored in the packet storage unit 11. More specifically, when the resolution alteration unit 14 determines that the state wherein the size of the fluctuation of the measurement value of the available bandwidth (absolute value of the difference between the measurement value of the available bandwidth that was found in the previous measurement and the measurement value of the available bandwidth that was found in the current measurement) is less than the bandwidth fluctuation range threshold value 117 (is within a specified range of a specified period) continues a specified number of times specified by the bandwidth fluctuation count threshold value 118, or in other words, determines that the true value of the available bandwidth is stable, the resolution alteration unit 14 determines to improve the measurement resolution.

When the resolution alteration unit 14 determines to change the measurement resolution, the size alteration unit 15 changes the size of each of the measurement packets of the packet train so that the measurement range is narrowed and the resolution is improved. The method itself for changing the size is arbitrary, and for example, the resolution alteration unit 14, according to the following equations, finds the maximum packet size 115 and the size 112 of the second measurement packet, and adjusts the size 112 and the packet size incremental increase amount 116 of the other measurement packets to match this.

Maximum packet size 115 after the change=Packet size 112 of the boundary measurement packet before the change Size 112 of the second measurement packet after the change=Size 112 of the previous boundary measurement packet before the change The reason that the size alteration unit 15 changes the packet size 112 of the second measurement packet to the packet size 112 of the previous boundary measurement packet of the previous measurement, is that when the boundary measurement packet was the second measurement packet, there is a possibility that the transmission rate of the first measurement packet also exceeds the actual available bandwidth, so that generates a measurement packet having a size that is less than the first measurement packet. Moreover, by changing the packet size 112 of the second measurement packet to the packet size of the one previous boundary measurement packet of the previous measurement, it is possible to reduce the effect of error during the process for receiving measurement packets.

The packet generation unit 10 generates a packet train after change based on each packet size and packet size incremental increase amount 116 changed by the size alteration unit 15.

In this way, the available bandwidth measurement system 100, as long as the fluctuation amount of the measurement value of the available bandwidth is within a specified period and a specified range, improves the measurement resolution by narrowing down the measurement range for the available bandwidth and fragmenting the incremental increase amount of the transmission rate for each measurement packet.

Next, how the resolution alteration unit 14 and size alteration unit 15 specifically change the minimum packet size 114, the maximum packet size 115, the packet size incremental increase amount 116 and the bandwidth fluctuation range threshold value 117 will be explained in detail.

In the packet train before change in FIG. 3, the transmission interval 113 is taken to be T, the number of measurement packets 112 is taken to be N, the packet size incremental increase amount 116 is taken to be $\Delta P$, and the packet size 112 of the ith (i+1, 2, 3, . . . , N) measurement packet is taken to be P(i). The minimum packet size 114 of the packet train before change is P(1), and the maximum packet size 115 is P(N). Furthermore, in the packet train after change, the packet size incremental increase amount 116 is taken to be $\Delta Q$, and the packet size 112 of the ith measurement packet is taken to be Q(i). The minimum packet size 114 of the packet train after change is Q(1), and the maximum packet size 115 is Q(N).

Here, when N=5, the measurement range before change is expressed by the following equation.

$$\text{Measurement range}=\{P(N)-P(2)\}/T=\{P(5)-P(2)\}/T=3\times\Delta P/T$$

Here, the measurement range is the range of transmission rates measured by the transmission device 2, and the transmission rates that are measured are in the range from the transmission rate of the second measurement packet to the transmission rate of the fifth packet. The reason that the measurement range is $\{P(N)-P(2)\}$ is that the first measurement packet cannot be the boundary measurement packet.

Moreover, the measurement resolution before change is given by the following equation.

$$\{P(i)-P(i-1)\}/T=\Delta P/T$$

Here, in order to make the explanation easier to understand, it is presumed that the bandwidth fluctuation range threshold value 117 is set to the resolution ΔP/T, and that the bandwidth fluctuation count threshold value 118 is set to "1" (the measurement resolution is changed when it is detected that the fluctuation amount of the measurement value of the available bandwidth is within a specified range one time).

Figure 4A:
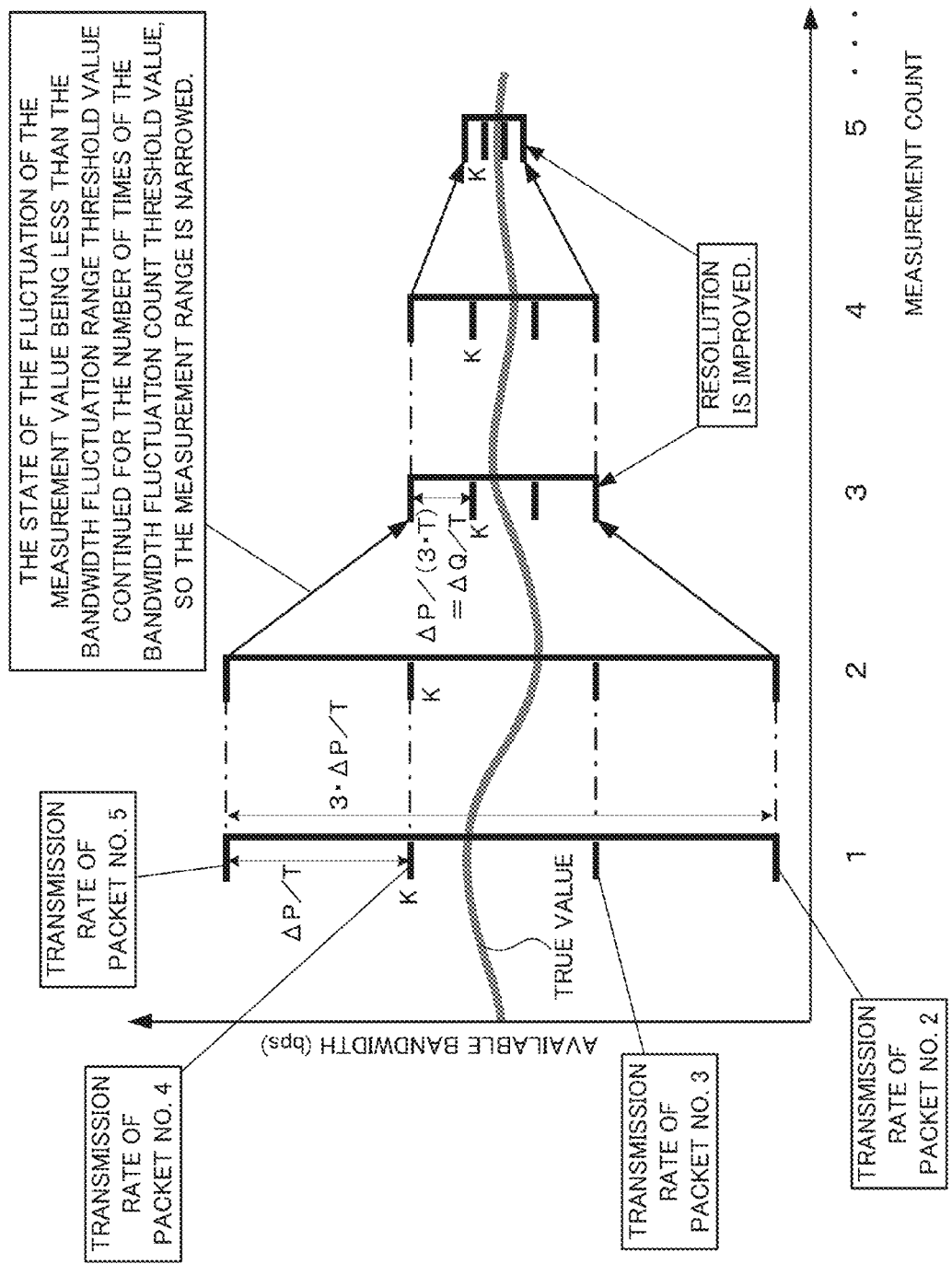
FIG. 4A is a drawing illustrating an example of available bandwidth measurement of an embodiment of the invention, and illustrates an example of operation when changing the resolution.

In this premise, it is presumed that measurement starts and the true value of the fluctuation range fluctuates as illustrated in FIG. 4A.

In this case, in the first measurement, the packet number k of the boundary measurement packet becomes 4.

Furthermore, even in the second measurement, k=4. Therefore, in the first measurement and the second measurement, the measurement value of the available bandwidth 226 becomes P(4)/T. Consequently, the difference between the available bandwidth measured in the first measurement and in the second measurement (=fluctuation amount) becomes 0. Therefore the fluctuation amount=0<bandwidth fluctuation range threshold value 117=resolution ΔP/T. The bandwidth fluctuation count threshold value is 1. Therefore, the resolution alteration unit 14 determines that the condition for changing the resolution has been met.

As a result, the size alteration unit 15 changes the maximum packet size 115 to Q(N)=P(k)=P(4), and changes the packet size 112 of the second measurement packet as follows.

$$Q(2)=P(k-1)=P(1)+(k-2)\times\Delta P=P(1)+2\times\Delta P$$

Furthermore, the size alteration unit 15 changes the packet size incremental increase amount 116 to the value given by the following equation.

$$\Delta Q=\Delta P/(N-2)=\Delta P/3$$

Therefore, the measurement range of the packet train after change becomes $$\{Q(N)-Q(2)\}/T=\{Q(5)-Q(2)\}/T=\{P(4)-P(3)\}/T=\Delta P/T$$

and when compared with the packet train before change, is ⅓ the range. As a result, the measurement resolution becomes $$\{Q(i)-Q(i-1)\}/T=\Delta Q/T=\Delta P/3T$$

and is three times or greater than that of the packet train before change.

Moreover, the size alteration unit 15 takes the minimum packet size 114 of the packet train after change to be $$Q(1)=Q(2)-\Delta Q=P(1)+2\times\Delta P-\Delta P/3=P(1)+5\times\Delta P/3$$

Furthermore, the size alteration unit 15 changes the bandwidth fluctuation range threshold value 117 to ΔP/3T, which is the measurement resolution of the packet train after change.

Continuing, in the third and fourth measurements as well, k=4, and it is determined that the measurement was continuous for the number of times (one time) set by the bandwidth fluctuation count threshold value 118 and that the fluctuation range of the true value of the available bandwidth 226 was within the range (ΔP/3T) set by the bandwidth fluctuation range threshold value 117. Therefore, similar to the available bandwidth measurement described above, that packet size and the packet size incremental increase amount is changed, and that measurement range is further narrowed by ⅓, and the measurement resolution is further improved by three times to ΔP/9T.

Figure 4B:
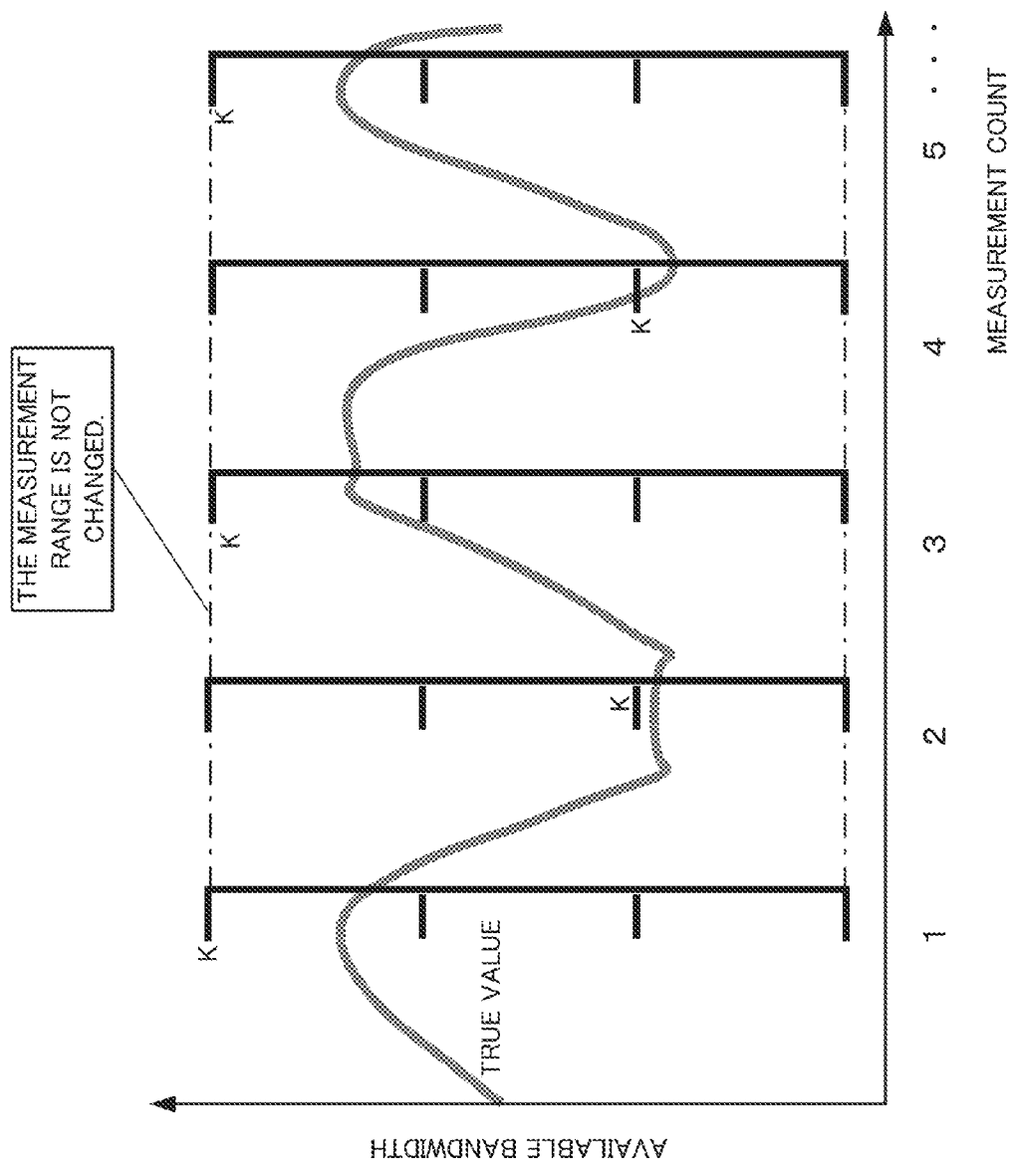
FIG. 4B is a drawing illustrating an example of available bandwidth measurement of an embodiment of the invention, and illustrates an example of operation when the resolution is not changed.

Next, as illustrated in FIG. 4B, a case is supposed wherein the true value of the available bandwidth changed.

In this example, the package number k of the boundary measurement packet in the first measurement is 5. In the second measurement, k=3. Therefore, the difference between the value of the available bandwidth measured in the first measurement and second measurement (=fluctuation amount) becomes P(5)/T−P(3)/T=2·ΔP/T. Therefore, the fluctuation amount=2·ΔP/T>bandwidth fluctuation range threshold value 117=resolution ΔP/T. As a result, the resolution alteration unit 14 determines that the condition for changing the measurement resolution has not been met. In the third and fourth measurements as well, determination is performed in a similar way. Consequently, the measurement range for the available bandwidth is not changed.

Figure 4C:
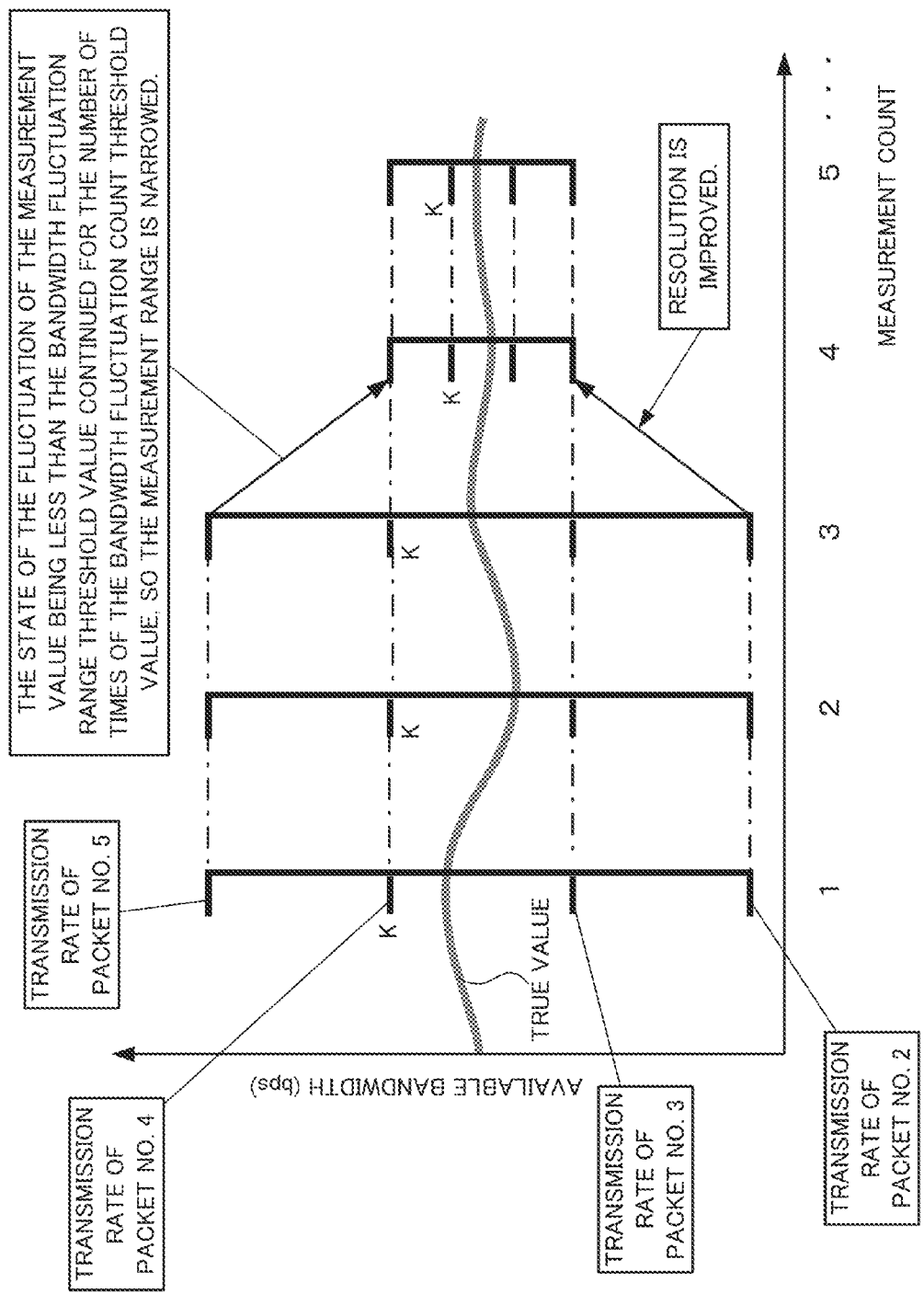
FIG. 4C is a drawing illustrating an example of available bandwidth measurement of an embodiment of the invention, and illustrates another example of operation when changing the resolution.

Next, an example of operation when the bandwidth fluctuation count threshold value is set to "2" will be explained with reference to FIG. 4C.

Here, the other conditions are the same as in the example in FIG. 4A.

In this example, in the first measurement, the packet number k of the boundary measurement packet is 4. Even in the second measurement, k=4. The difference (=fluctuation amount) between the available bandwidth that is set in the first measurement and second measurement is 0. The fluctuation amount=0<bandwidth fluctuation range threshold value 117=resolution ΔP/T. However, the continuous number of times 1<bandwidth fluctuation count threshold value=2, so that the condition for changing the resolution is not met.

In the third measurement as well, k=4. The difference (=fluctuation amount) between the available bandwidth that is set in the second measurement and third measurement is 0, and the fluctuation amount=0<bandwidth fluctuation range threshold value 117=resolution ΔP/T. Furthermore, the continuous number of times 2≤bandwidth fluctuation count threshold value 2. Therefore, the condition for changing the measurement resolution is satisfied.

As a result, the resolution alteration unit 14 determines that the condition for changing the measurement resolution has been met.

The size of each measurement packet after change is the same as in the example in FIG. 4A.

Moreover, when k=null, or in other words, when the boundary measurement packet is not detected, the packet generation unit 10 can generate a packet train for which Q(1)=P(N), or can generate a default packet train.

Furthermore, when k=2, there is also a possibility that P(1)/T greatly exceeds the actual available bandwidth, so that the packet generation unit 10 can also generate a measurement packet whose packet size is further less than Q(2)−ΔQ=P(1)−ΔP/3.

However, when there is no possibility that P(1)/T will exceed the actual available bandwidth, and the effect of the error when receiving measurement packets does not need to be taken into consideration, the size alteration unit 15 can change the packet size 112 of the first measurement packet to the packet size 112 one measurement packet before the boundary measurement packet of the previous time. Furthermore, in this case, the measurement range can be {P(N)−P(1)}.

Figure 5:
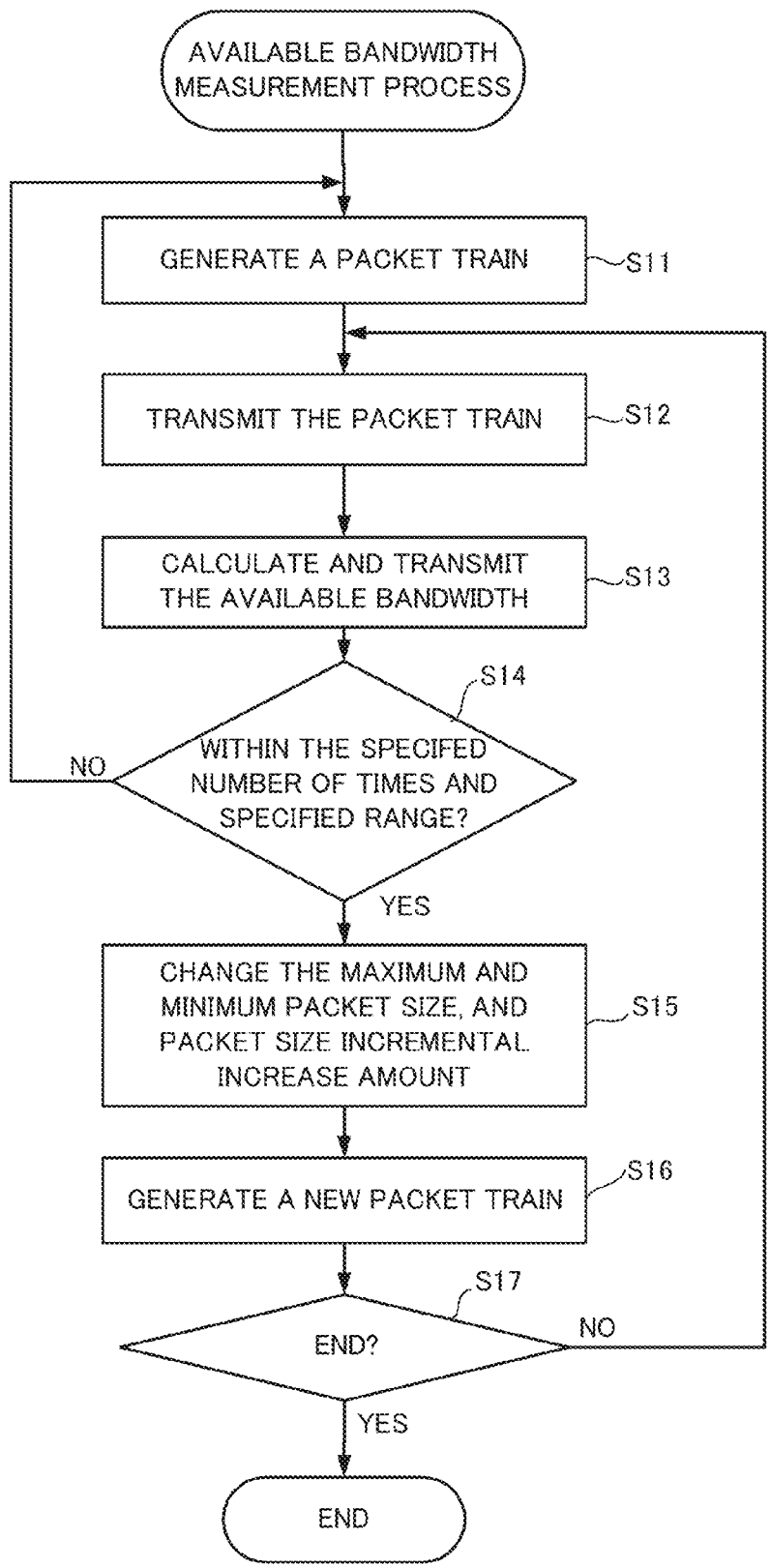
FIG. 5 is a flowchart that illustrates an example of operation of an available bandwidth measurement process of an embodiment of the invention.

Next, the series of operations by the transmission device 1 and the reception device 2 in the available bandwidth measurement process explained above will be explained with reference to the flowchart in FIG. 5.

First, the packet generation unit 10 of the transmission device 1 generates a packet train having N number of measurement packets whose packet sizes uniformly increase in order (step S11). The transmission control unit 12 controls the transmission/reception unit 13 so that the N number of measurement packets of the packet train generated by the packet generation unit 10 are transmitted at a uniform transmission interval 113 that was specified by the transmission interval 113, and the transmission/reception unit 13 transmits the packet train to the reception device 2 (step S12).

The calculation unit 21 of the reception device 2 receives the transmitted packet train, detects the boundary measurement packet, calculates an available bandwidth 226 based on the interval increase starting number 225 that indicates the boundary measurement packet, and returns the available bandwidth 226 to the transmission device 1 (step S13). The resolution alteration unit 14, based on the value of the available bandwidth 226 that was received by the transmission/reception unit 13, determines whether or not the fluctuation range of the value of the available bandwidth 226 is continuously within the range of the bandwidth fluctuation range threshold value 117 the same number of times as the bandwidth fluctuation count threshold value 118 (step S14). When the fluctuation range is not continuously within the bandwidth fluctuation threshold value 117 the same number of times as the bandwidth fluctuation count threshold value 118 (step S14: NO), processing returns to step S11, and steps S11 to S114 are repeated.

On the other hand, when the fluctuation range is continuously within the bandwidth fluctuation threshold value 117 the same number of times as the bandwidth fluctuation count threshold value 118 (step S14: YES), the size alteration unit 15 changes the minimum packet size 114, the maximum packet size 115 and the packet size incremental increase amount 116 based on the available bandwidth 226 (step S15). When doing this, the size alteration unit 15 also changes the bandwidth fluctuation range threshold value 117. The packet generation unit 10 generates a new packet train based on the changed minimum packet size 114, maximum packet size 115 and packet size incremental increase amount 116 (step S16). When measurement of the available bandwidth has not ended (step S17: NO), processing returns to step S12, and steps S12 to step S17 are repeated. When measurement of the available bandwidth has ended (step S17: YES), processing ends.

As explained above, with the available bandwidth measurement system 100 of this embodiment, it is possible to narrow down the measurement range for the available bandwidth to near the previous measurement results by adjusting the packet size of the measurement packet according to the previous measurement results, without changing the number of measurement packets in the packet train or the transmission interval, and thus it is possible to improve the measurement resolution for measuring the available bandwidth with a small communication load.

Figure 6:
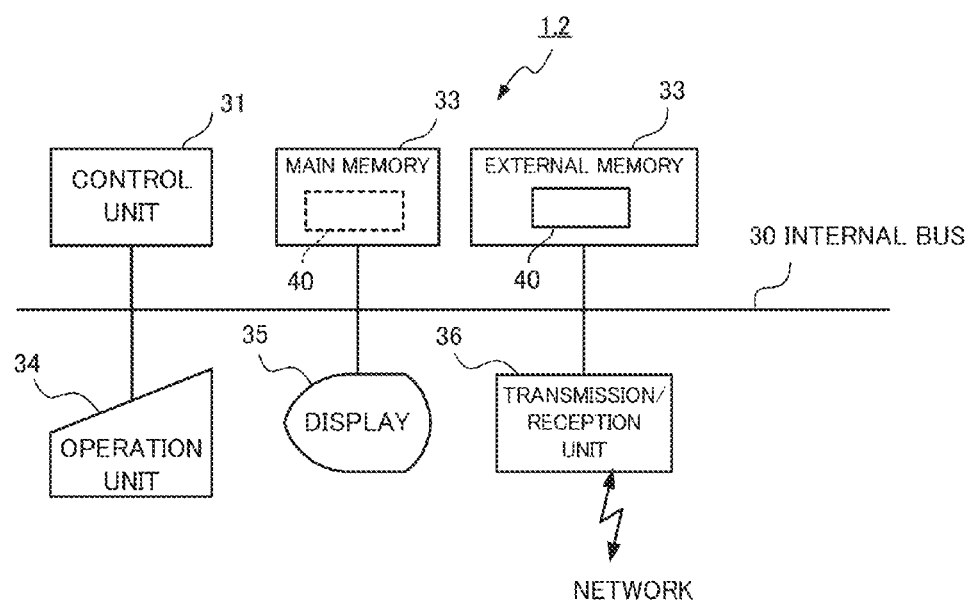
FIG. 6 is a block diagram illustrating an example of hardware of an available bandwidth measurement system of an embodiment of the invention.

FIG. 6 is block diagram illustrating an example of the hardware of the usable measurement system of the embodiments. As illustrated in FIG. 6, the transmission device 1 and the reception device 2 are provided with a control unit 31, a main memory 32, an external memory 33, an operation unit 34, a display 35 and a transmission/reception unit 36. The main memory 32, external memory 33, operation unit 34, display 35 and transmission/reception unit 36 are all connected to the control unit 31 by way of an internal bus 30.

The control unit 31 is composed of a CPU (Central Processing Unit), and execute various processing according to a control program 40 that is stored in the external memory 33. In the case of the transmission device 1, the control unit 31 executes the various processing for packet generation unit 10, transmission control unit 12, transmission/reception unit 13, resolution alteration unit 14 and size alteration unit 15. In the case of the reception device 2, the control unit 31 executes the various processing for the transmission/reception unit 20 and the calculation unit 21.

The main memory 32 is composed of a RAM (Random Access Memory), and the control program 40 that is stored in the external memory 33 is loaded into the main memory 32, and this main memory 32 is used as a work area for the control unit 31.

The external memory 33 is composed of a non-volatile memory such as a flash memory, hard disk, DVD-RAM (Digital Versatile Disc Random Access Memory), DVD-RW (Digital Versatile Disc ReWritable) and the like, and this external memory 33 stores a program in advance for causing the control unit 31 to perform the processing of the transmission device 1 or reception device 2, and according to instructions from the control unit 31, supplies data that the program stores to the control unit 31, and stores data that is supplied from the control unit 31. In the case of the transmission device 1, the packet memory 11 is formed in the external memory 33. In the case of the reception device 2, the data memory 22 is formed in the external memory 33.

The operation unit 34 is composed of a keyboard and a pointing device such as a mouse, and an interface device to which the keyboard and pointing device are connected by way of an internal bus 30. In the case of the transmission device 1, when setting the packet number 111, packet size 112, transmission interval 113, minimum packet size 114, maximum packet size 115, packet size incremental increase amount 116, bandwidth fluctuation range threshold value 117 and bandwidth fluctuation count threshold value 118, instructions are supplied to the control unit 31 by way of the operation unit 34.

The display 35 is composed of a CRT (Cathode Ray Tube) or an LCD (Liquid Crystal Display), and in the case of the transmission device 1, displays an operation screen when setting the packet number 111, packet size 112, transmission interval 113, minimum packet size 114, maximum packet size 115, packet size incremental increase amount 116, bandwidth fluctuation range threshold value 117 and bandwidth fluctuation count threshold value 118.

The transmission/reception unit 36 is composed of a network terminal device or a wireless communication device that is connected to a network, and a serial interface or LAN (Local Area Network) interface that is connected thereto. The transmission/reception unit 36 of the transmission device 1 and reception device 2 mutually exchanges information via a network.

Processing by the packet generation unit 10, transmission control unit 12, transmission/reception unit 13, resolution alteration unit 14, size alteration unit 15, transmission/reception unit 20 and calculation unit 21 illustrated in FIG. 1 is executed by the control program 40 performing processing using the control unit 31, main memory 32, external memory 33, operation unit 34, display 35 and transmission/reception unit 36 as resources.

In addition, the hardware and flowchart above are examples, and can be arbitrarily modified or corrected.

The center portion that is composed of the control unit 31, main memory 32, external memory 33, operation unit 34 and internal bus 30 and that perform the available bandwidth measurement process can be achieved using a normal computer system instead of a special system. For example, a computer program for executing the operation above can be stored and distributed on a recording medium (flexible disc, CD-ROM, DVD-ROM and the like) that is readable by a computer, and by installing that computer program onto a computer, an available bandwidth measurement system 100 that executes the processing above can be formed. Moreover, a computer program can be stored in a memory of a server on a communication network such as the Internet, and an available bandwidth measurement system 100 can be formed by a typical computer system downloading that computer program.

Furthermore, when the functions of the available bandwidth measurement system 100 are achieved by sharing the OS (Operating System) and application programs, or by cooperation with the OS and application programs, it is possible to store just the application programs on a recording medium or in memory.

In order to make the explanation of the embodiments above easier to understand, an example was given in which the sizes of the packets of the packet train increased in order by an equal difference; however, it is not necessary that the sizes increase by an equal difference. The sizes can increase by a difference that is set based on fixed rules. Moreover, the packets of the packet train were transmitted in order of smallest size; however, it is also possible to transmit packets in a different order. The bandwidth fluctuation range threshold value was set to the resolution, but another value could be selected. Furthermore, the procedure for specifying the size of each measurement packet after change and which measurement packet size to use as a reference can be arbitrarily changed. For example, the size of each measurement packet could also be specified and changed based on the size and packet size incremental increase amount of the second measurement packet. The transmission interval of the measurement packets does not need to be fixed.

The computer program could be superimposed on a carrier wave, and distributed via a communication network. For example, the computer program could be posted on a bulletin board (BBS, Bulletin Board System) on a communication network, and that computer program can be distributed via the network. Construction can be such that the processing described above is be executed by activating the computer program and executing that program in the same way as other application programs under the control of the OS.

The present invention can undergo various embodiment and variations within the wide spirit and range of the invention. The embodiments above are for explaining the present invention and do not limit the range of the invention. In other words, the range of the present invention is the range disclosed in the claims and not the embodiments. Various modifications that are within the scope of the claims and within the broad range of an equivalent invention are also regarded as being within the scope of the present invention.

Part or all of the embodiments above are disclosed in but not limited to the additional notes below.

(Note 1)

The available bandwidth measurement system of the present invention is a system that is provided with a transmission device and a reception device that are connected to a network; wherein the transmission device is provided with:

a generation unit that generates a specified number of measurement packets whose packet sizes increase in order by an equal difference;

a first transmission unit that transmits the measurement packets to the reception device; and a control unit that controls the first transmission unit so that the measurement packets are uniformly transmitted at a specified transmission interval; and the reception device is provided with:

a second reception unit that receives the measurement packets from the transmission device;

a calculation unit that, based on the time that the measurement packets are received, calculates an available bandwidth that indicates a bandwidth that can be used by the network; and a second transmission unit that transmits the available bandwidth to the transmission device;

the transmission device being further provided with:

a first reception unit that receives the available bandwidth from the reception device;

a judgment unit that, based on the available bandwidth, determines whether or not to change the measurement resolution; and an alteration unit that, based on the available bandwidth when the judgment unit determines to change the measurement resolution, changes a minimum packet size that indicates the smallest size of the measurement packets, a maximum packet size that indicates the largest size of the measurement packets, and a packet size incremental increase amount that indicates the equal difference; and wherein the generation unit generates new measurement packets based on the minimum packet size, maximum packet size and the packet size incremental increase amount that were changed by the alteration unit.

(Note 2) In the available bandwidth measurement system according to note 1, the generation unit generates a packet train that is composed of a specified number of measurement packets whose packet sizes increase in order by an equal difference, and have a transmission interval that is a specified uniform interval; and the judgment unit determines whether or not the available bandwidth is continuously within a specified range a specified number of times, and when it is determined that the available bandwidth is continuously within the specified range the specified number of times, determines to change the measurement resolution, and when it is determined that the available bandwidth is not continuously within the specified range the specified number of times, determines not to change the measurement resolution.

(Note 3) In the available bandwidth measurement system according to note 1 or note 2, the measurement packets include the transmission interval value; and the calculation unit acquires the value of the reception interval of the measurement packets, compares the value of the reception interval with the value of the transmission interval, detects a boundary measurement packet, which is the measurement packet for which the value of the reception interval first becomes greater than the value of the transmission interval, and calculates the available bandwidth based on that boundary measurement packet.

(Note 4)

In the available bandwidth measurement system according to note 3, the alteration unit changes the maximum packet size to the packet size of the boundary measurement packet of the previous measurement, changes the packet size of the second measurement packet to the packet size of one previous boundary measurement packet in the previous measurement, and changes the packet size incremental increase amount to a value that is the result of dividing the packet size incremental increase amount from the previous measurement by the value of the number of measurement packets minus 2.

(Note 5)

In the available bandwidth measurement system according to note 4, the alteration unit, when changing the minimum packet size, maximum packet size and packet size incremental increase amount, changes the specified range to a value that is the result of dividing the packet size incremental increase amount after change by the transmission interval.

(Note 6)

In the available bandwidth measurement system according to any one of the notes 1 to 5, the measurement packets are IP packets, UDP packets or RTP packets.

(Note 7)

In the available bandwidth measurement system according to anyone of the notes 2 to 6, the judgment unit specifies the specified number of times as a system control parameter.

(Note 8)

In the available bandwidth measurement system according to anyone of the notes 2 to 7, the judgment unit specifies the specified range as a system control parameter.

(Note 9)

A transmission device that is provided with:

a generation unit that generates measurement packets whose packet sizes increase in order;

a transmission unit that transmits the measurement packets at a specified transmission interval;

a reception unit that receives a measurement value for an available bandwidth that indicates the available bandwidth that was found based on the transmitted measurement packets;

a judgment unit that, based on the received measurement value for the available bandwidth, determines whether or not to change the measurement resolution; and an alteration unit that, when the judgment unit determined to change the measurement resolution, changes the size of the measurement packets based on the available bandwidth so that the measurement resolution increases; wherein the generation unit generates new measurement packets having the size changed by the alteration unit.

(Note 10)

The available bandwidth measurement method of the present invention executes a system that is provided with a transmission device and a reception device that are connected to a network; wherein the transmission device executes:

a generation step that generates a specified number of measurement packets whose packet sizes increase in order;

a first transmission step that transmits the measurement packets to the reception device; and a control step that controls the first transmission unit so that the measurement packets are uniformly transmitted at a specified transmission interval; and the reception device executes:

a second reception step that receives the measurement packets from the transmission device;

a calculation step that, based on the time that the measurement packets are received, calculates an available bandwidth that indicates a bandwidth that can be used by the network; and a second transmission step that transmits the available bandwidth to the transmission device;

the transmission device further executes:

a first reception step that receives the available bandwidth from the reception device;

a judgment step that, based on the available bandwidth, determines whether or not to change the measurement resolution; and a generation step that, when the judgment step determined to change the measurement resolution, generates, based on the available bandwidth, new measurement packets having the changed size so that the resolution is improved.

(Note 11)

The program of the present invention, or the computer-readable recording medium on which that program is stored, causes a computer to execute:

a generation step that generates a specified number of measurement packets whose packet sizes increase in order by an equal difference;

a first transmission step that transmits the measurement packets to the reception device; and a control step that controls the first transmission unit so that the measurement packets are uniformly transmitted at a specified transmission interval;

a second reception step that receives the measurement packets from the transmission device;

a calculation step that, based on the time that the measurement packets are received, calculates an available bandwidth that indicates a bandwidth that can be used by the network; and a second transmission step that transmits the available bandwidth to the transmission device;

the transmission device being further executing:

a first reception step that receives the available bandwidth from the reception device;

a judgment step that, based on the available bandwidth, determines whether or not to change the measurement resolution; and an alteration step that, based on the available bandwidth when the judgment unit determines to change the measurement resolution, changes a minimum packet size that indicates the smallest size of the measurement packets, a maximum packet size that indicates the largest size of the measurement packets, and a packet size incremental increase amount that indicates the equal difference; and wherein the generation step generates new measurement packets based on the minimum packet size, maximum packet size and the packet size incremental increase amount that were changed by the alteration step.

(Note 12)

The computer-readable recording medium of the present invention stores a computer program that causes a computer to achieve:

a generation function that generates measurement packets whose packet sizes increase in order;

a transmission function that uniformly transmits the measurement packets in a specified order at a specified transmission interval;

a reception function that receives the measurement value for the available bandwidth that indicates the available bandwidth that was found based on the transmitted measurement packets;

a judgment function that, based on the available bandwidth, determines whether or not to change the measurement resolution; and a generation function that, when the judgment function determined to change the measurement resolution, generates, based on the available bandwidth, new measurement packets having the changed size so that the measurement resolution improves.

This specification is based on Japanese Patent Application No. 2010-099914 filed on Apr. 23, 2010. The entire specification, claims and drawings of Japanese Patent Application No. 2010-099914 are incorporated in this specification by reference.

DESCRIPTION OF REFERENCE NUMERALS

1 Transmission device
2 Reception device
8 Network
10 Packet generation unit
11 Packet memory
12 Transmission control unit
13 Transmission/reception unit
14 Resolution alteration unit
15 Size alteration unit
20 Transmission/reception unit
21 Calculation unit
22 Data memory
30 Internal bus
31 Control unit
32 Main memory
33 External memory
34 Operation unit
35 Display
36 Transmission/reception unit
40 Control program
100 Available bandwidth measurement system
111 Packet number
112 Packet size
113 Transmission interval
114 Minimum packet size
115 Maximum packet size
116 Packet size incremental increase amount
117 Bandwidth fluctuation range threshold value
118 Bandwidth fluctuation count threshold value
221 Packet number
222 Packet size
223 Transmission interval
224 Reception interval
225 Interval increase starting number
226 Available bandwidth

The invention claimed is:

1. An available bandwidth measurement system comprising a transmission device and a reception device that are connected to a network, the transmission device comprising a first transmitter, a first receiver, and a first processor, and the reception device comprising a second transmitter, a second receiver, and a second processor,
wherein the first processor is configured to:
generate a specified number of measurement packets whose packet sizes increase in order by an equal difference; and
control the transmitter to transmit the measurement packets to the reception device uniformly at a specified transmission interval,
wherein the second receiver is configured to receive the measurement packets from the transmission device,
wherein the second processor is configured to:
calculate, based on the time that the measurement packets are received, an available bandwidth that indicates a bandwidth that can be used by the network; and
control the second transmitter to transmit the available bandwidth to the transmission device,
wherein the first receiver is configured to receive the available bandwidth from the reception device,
wherein the first processor is further configured to:
determine, based on the available bandwidth, whether or not to change the measurement resolution;
change, based on the available bandwidth when it is determined to change the measurement resolution, a minimum packet size that indicates the smallest size of the measurement packets, a maximum packet size that indicates the largest size of the measurement packets, and a packet size incremental increase amount that indicates the equal difference; and
generate new measurement packets based on the minimum packet size, maximum packet size and the packet size incremental increase amount that were changed,
wherein the second processor is further configured to acquire a value of a reception interval of the measurement packets, compare the value of the reception interval with the value of the transmission interval, detect a boundary measurement packet, which is the measurement packet for which the value of the reception interval first becomes greater than the value of the transmission interval, and calculate the available bandwidth based on that boundary measurement packet,
wherein the first processor is further configured to change the maximum packet size to the packet size of the boundary measurement packet of the previous measurement, change the packet size of the new measurement packet to the packet size of one previous boundary measurement packet in the previous measurement, and change the packet size incremental increase amount to a value that is the result of dividing the packet size incremental increase amount from the previous measurement by the value of the number of measurement packets minus 2, and
wherein the measurement packets include a transmission interval value.

2. The available bandwidth measurement system according to claim 1, wherein the first processor is further configured to:
generate a packet train that is composed of a specified number of measurement packets whose packet sizes increase in order by an equal difference, and have a transmission interval that is a specified uniform interval; and
determine whether or not the available bandwidth is continuously within a specified range a specified number of times, and when it is determined that the available bandwidth is continuously within the specified range the specified number of times, determine to change the measurement resolution, and when it is determined that the available bandwidth is not continuously within the specified range the specified number of times, determines not to change the measurement resolution.

3. The available bandwidth measurement system according to claim 1, wherein the first processor is further configured to, when changing the minimum packet size, maximum packet size and packet size incremental increase amount, change the specified range to a value that is the result of dividing the packet size incremental increase amount after change by the transmission interval.

4. The available bandwidth measurement system according to claim 1, wherein, the measurement packets are Internet Protocol packets, User Datagram Protocol packets or Real-time Transport Protocol packets.

5. A transmission device comprising:
a transmitter;
a receiver;
and a processor configured to:
generate measurement packets whose packet sizes increase in order; and
control the transmitter to transmit the measurement packets at a specified transmission interval, wherein the receiver is configured to receive a measurement value for an available bandwidth that indicates the available bandwidth that was found based on the transmitted measurement packets, and wherein the processor is further configured to:
- determine, based on the received measurement value for the available bandwidth, whether or not to change the measurement resolution and
- change, when it is determined to change the measurement resolution, the size of the measurement packets based on the available bandwidth so that the measurement resolution increases;
- generate new measurement packets having the size changed; and
- change the maximum packet size to the packet size of a boundary measurement packet, which is the measurement packet for which the value of the reception interval first becomes greater than the value of the transmission interval, of the previous measurement, change the packet size of the new measurement packet to the packet size of one previous boundary measurement packet in the previous measurement, and change the packet size incremental increase amount to a value that is the result of dividing the packet size incremental increase amount from the previous measurement by the value of the number of measurement packets minus 2, and wherein the measurement packets include a transmission interval value.

6. An available bandwidth measurement method that executes a system that comprises a transmission device and a reception device that are connected to a network, wherein:

the transmission device:
- generates a specified number of measurement packets whose packet sizes increase in order; and
- transmits the measurement packets to the reception device uniformly at a specified transmission interval;

wherein the reception device:
- receives the measurement packets from the transmission device;
- acquires a value of a reception interval of the measurement packets;
- compares the value of the reception interval with the value of a transmission interval;
- detects a boundary measurement packet, which is the measurement packet for which the value of the reception interval first becomes greater than the value of the transmission interval;
- calculates, based on the time that the measurement packets are received and based on the boundary measurement packet, an available bandwidth that indicates a bandwidth that can be used by the network; and
- transmits the available bandwidth to the transmission device;

wherein the transmission device further:
- receives the available bandwidth from the reception device;
- determines, based on the available bandwidth, whether or not to change the measurement resolution;
- changes the maximum packet size to the packet size of the boundary measurement packet of the previous measurement;
- generates, based on the available bandwidth when the transmission device determines to change the measurement resolution, new measurement packets having a changed size so that the resolution is improved; and
- changes the packet size of the new measurement packet to the packet size of one previous boundary measurement packet in the previous measurement, and changes the packet size incremental increase amount to a value that is the result of dividing the packet size incremental increase amount from the previous measurement by the value of the number of measurement packets minus 2; and wherein the measurement packets include a transmission interval value.

7. A non-transitory computer-readable recording medium that stores a computer program that causes a computer to achieve:
- a generation function that generates measurement packets whose packet sizes increase in order;
- a transmission function that uniformly transmits the measurement packets in a specified order at a specified transmission interval;
- a reception function that receives the measurement value for an available bandwidth that indicates the available bandwidth that was found based on the transmitted measurement packets;
- a judgment function that, based on the available bandwidth, determines whether or not to change the measurement resolution; and
- a generation function that generates, based on the available bandwidth when the judgment function determines to change the measurement resolution, new measurement packets having a changed size so that the measurement resolution improves, changes the maximum packet size to the packet size of a boundary measurement packet, which is the measurement packet for which the value of the reception interval first becomes greater than the value of the transmission interval, of the previous measurement, changes the packet size of the new measurement packet to the packet size of one previous boundary measurement packet in the previous measurement, and changes the packet size incremental increase amount to a value that is the result of dividing the packet size incremental increase amount from the previous measurement by the value of the number of measurement packets minus 2, wherein the measurement packets include a transmission interval value.

* * * * *